Oct. 11, 1966

K. WICHLAJEW ETAL 3,278,688

TELEPHONE CIRCUIT HAVING MEANS FOR PREVENTING DOUBLE CONNECTIONS

Filed June 11, 1963

INVENTORS
KARL WICHLAJEW
JOHN P. DAVIS

BY Watson, Cole, Grindle & Watson
ATTORNEYS

United States Patent Office 3,278,688
Patented Oct. 11, 1966

3,278,688
TELEPHONE CIRCUIT HAVING MEANS FOR PREVENTING DOUBLE CONNECTIONS

Karl Wichlajew and John P. Davis, Charlottesville, Va., assignors to Stromberg-Carlson Corporation, a corporation of Delaware Filed June 11, 1963, Ser. No. 287,058
4 Claims. (Cl. 179—18)

Figure 1:
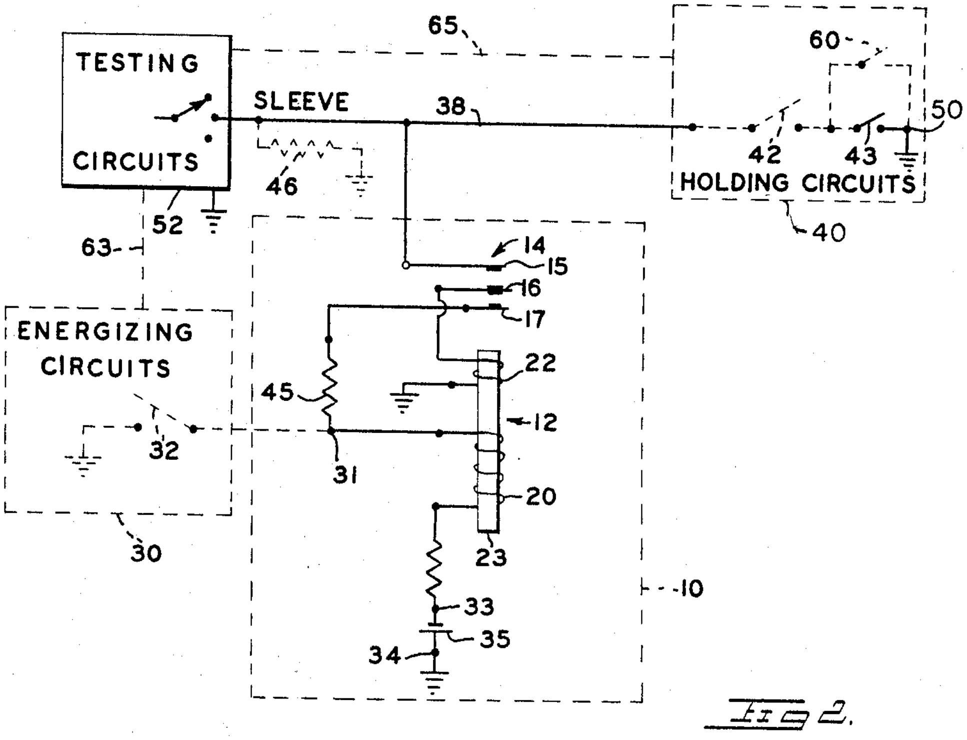

This invention relates to switching control circuits and more particularly, it relates to switching circuits using control relays in telephone line finding operations.

It has been found in telephone switching operations that occasionally a double connection is made when a call is initiated, resulting not only in connection to the proper line, but in a spurious connection to an unspecified line. Since such calls occur only occasionally, and since the connections apparently are made to random numbers, which even then are not frequently traceable because they generally need be identified and reported by a subscriber, it has been difficult to find the cause of the double connections.

However, we have found in accordance with the present invention that such double connections are caused by race conditions encountered between the drop out and actuation actions in certain telephone switching circuits. Thus, under certain conditions, the line finding circuits test into lines which are in the process of releasing from a terminated call and do not indicate a busy line. In doing such, the test circuits will succeed in making connections holding the line from the terminated call in circuit for the duration of the new call.

Having thus traced the cause of the double connection, the significant problem was presented of solving a relay switching race condition, where no control could be made in the timing of the sequence of operations. Normally, a race condition solution involves the design of switching circuits so that the sequence is presented in such order that the race condition is not encountered. In a telephone system, however, the above difficulty is encountered as a result of randomly timed calls from subscribers. Accordinly, a time or sequence cannot be planned.

Thus, one object of the invention is to provide relay switching circuits that are not susceptible to races in the sequence of conditions encountered in operation and release of the relay switching circuits.

Another object of the invention is to provide improved telephone line finding circuits which eliminate spurious double connections.

A further general object of the invention is to provide improved switching circuits embodying control relays.

In connection with the invention therefore, an improved holding relay circuit is provided in a telephone switching system employing battery testing on the sleeve conductor. This improvement is applicable to a relay having holding contacts which serve to maintain an energized condition wihen the relay is operated until a control signal releases the holding circuit. The sequence of operation and release control signals may be considered random. The improved relay circuit comprises an auxiliary holding contact coupled to a low impedence release winding with a ground connection coupling it in phase opposition to the holding winding. When the relay is in de-energized condition, the relay contacts are not connected together and the release winding is not in circuit. When the relay is in energized condition, the release winding is connected to the sleeve conductor with the holding contacts on the relay. When a call is in effect, both terminals of the release winding are grounded, since the sleeve conductor is grounded. However, when a call is terminated and the sleeve ground is broken, it takes a finite time for the holding contacts to break. In this condition current will flow through the release winding to accelerate the de-energization period. In addition, a test into the sleeve conductor connection will provide substantially a ground signal through the low impedance winding and the connection will test busy. This effectively prevents the possibility of a double connection encountered when a new call is made before the previous call has been fully disconnected.

Figure 2:
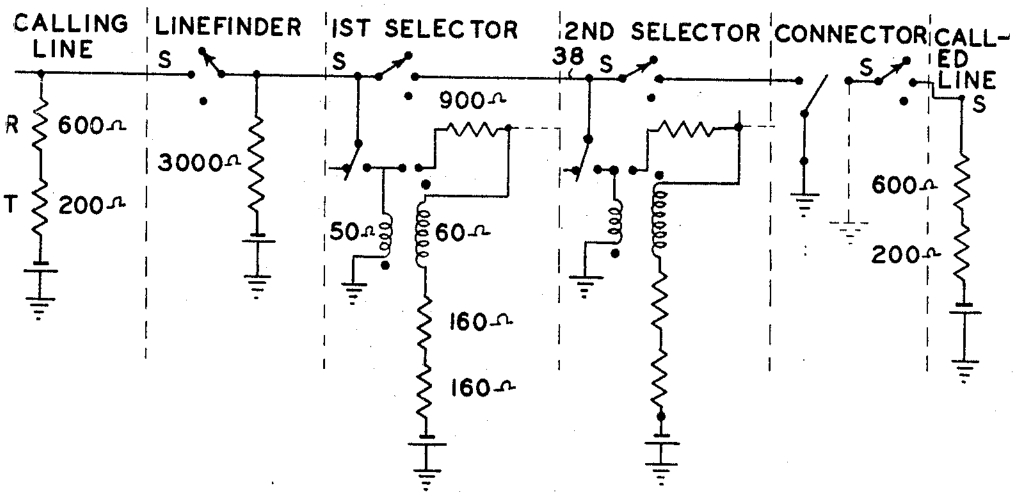

Further features and advantages of the invention will become apparent from the detailed description of the invention as follows, with reference to the accompanying drawing, wherein:

FIGURE 1 is a simplified schematic diagram of a switching control circuit embodiment of the invention; and FIGURE 2 is a partial schematic diagram of a telephone switching system constructed in accordance with the invention.

The simplified version of FIGURE 1 illustrates the principles of the invention provided by the relay switching circuit 10. However, both figures may be consulted simultaneously to correlate the simplified showing with conventional elements of a telephone switching system. In this embodiment, the holding relay 12 has an associated holding contact structure 14 including armature 15, auxiliary contact 16 and mating contact 17. The armature and its switching blade is biased in open condition so that the three contacts 15, 16 and 17 are disconnected in the de-energized state of the relay 12. In the energized state all three contacts 15, 16 and 17 are connected together.

The relay has an operating winding 20 and a low impedance release winding 22, which is connected in phase opposition to the operating winding 20 as seen by the wire path about relay core 23.

In order to avoid the complex presentation of the multiple elements of a telephone switching system, which might tend to obscure the nature of this invention, the various elements are diagrammatically presented in the view of FIGURE 1. Such elements as are shown in block diagram form or in dotted outline are conventionally used in telephone switching systems employing a sleeve conductor and providing battery testing on the sleeve conductor to determine busy or free lines in a line finding operation.

Thus, the box 30 represents telephone switching circuits which select and operate the holding relay 12 via operating winding 20 in accordance with selected conditions established when a telephone call is being processed. Effectively, these circuits provide energization signals by connecting to ground the operating winding terminal 31 through a circuit completed by switching means 32. This closes the relay winding circuit through the terminals 33 and 34 of energy source 35. Resulting current flow in operating winding 20 serves to energize the relay 12 so that operation of the magnetic field moves magnetically coupled armature 15 toward the core 23 to effect closure of the three contacts 15, 16 and 17.

Contact 17 serves as a holding contact via terminal 31 which is connected to conductor 38, representative of the sleeve conductor in a telephone switching system. When means as represented by box 40 is provided to find a line by building up connections through various telephone switching devices as represented by switches 42 and 43, the sleeve conductor 38 becomes grounded. In this condition, the relay 12 is held in energized condition by the current flowing through isolation resistor 45 which prevents sleeve ground from appearing at the circuit of selection means 30.

Other circuits connected in parallel with the sleeve conductor 38 may be represented by resistor 46 which presents a finite resistance to ground when switch 43 is opened. This results in a de-energization signal for relay 12 in view of the fact that switch 32 is only momentarily closed during the energization procedure. Holding switch 43 may represent the calling party connector switch that serves to release a call by removing ground at terminal 50.

Amongst the telephone switching circuits is battery testing means 52 serving to determine whether the ground condition exists on sleeve conductor 38, which produces a busy signal. Conversely, if switch 43 is opened, the resistance 46 existing until all circuits are disconnected, will be finite but has a high enough resistance to permit the testing circuit of box 52 to indicate the sleeve conductor 38 is not busy and is ready for connection. Then, circuit means included in box 40 will make appropriate selection of the sleeve conductor 38 through a series of built up connections.

It is recognized that when the armature 15 is closed and relay winding 20 becomes de-energized through opening of switch 43, then a de-energization period of finite time occurs before the contacts 15, 16 and 17 are opened. During this period, because the switch 43 is open, the sleeve conductor 38 will test non-busy to the testing circuit 52. This will result in a double connection where a call is made and switched into sleeve conductor 38 simultaneously with the de-energization period. Thus, a new line finder circuit 60 may be closed to ground terminal 50 thereby serving to reinstate the holding condition of relay 12 before the old lines (42 and 15) are disconnected. This results in an unwanted party or a dual connection, which, as hereinbefore stated, is difficult to locate in view of the random switching operations taking place, and the requirement for a caller to identify the number of the branch connection and report such.

The solution for this deficiency is found in part by provision of the opposition effect of release winding 22 in causing faster release of the contacts through magnetic repulsion. The possibly more significant factor, however, is the low impedance of winding 22, say fifty ohms, which causes the testing circuit 52 to show a busy signal until the winding 22 is fully disconnected by opened contacts 15, 16 and 17. Thus, means is provided not only for accelerating the de-energization period to produce more efficiency in the utility cycle of the lines, but the circuit is responsive to the battery testing circuits 52 to prevent false test signals at sleeve conductor 38. Energization signals are thus blocked through conventional telephone switching circuits when encountering a busy test through the testing circuits 52 as indicated by connecting dotted line 63 to energizing circuits 30. Similarly, finding circuit operations at box 40 are blocked by operation of the testing circuits when encountering busy lines, as typified by dotted line 65, thereby effectively preventing any false double connections in the telephone system.

Consider that without the improvements afforded herein, the randomly sequenced operations of energizing circuits 30, de-energizing signals at switch 43 and new line finding operations at switch 60 present a time race between switch closures that may not be resolved in the conventional manner of re-establishing an ordered sequence of operations. Obviously, such an approach in a complex telephone switching system would require extensive revisions not necessary in view of the teachings of this invention.

Therefore, applicants have provided improved switching control circuits and more reliable telephone systems as defined with particularity in the following claims.

We claim:

1. In a telephone switching system employing battery testing on the sleeve conductor, the combination comprising means for finding a line by building up a connection, means including at least one holding relay with an operating winding selectively coupled with the sleeve conductor for energization, the relay having holding contacts connected in circuit for keeping the operating winding in energized state after the winding is energized momentarily, means responsive to the battery testing for establishing a connection to the relay only when the relay is in a de-energized state, means producing a control signal for releasing the holding contacts, a low impedance winding on said relay coupled in phase opposition to the operating winding by the holding contacts when they are released for preventing a false test signal by accelerating the de-energization of the holding relay, and a circuit coupled to the relay during the period the relay is being de-energized to retain a battery test condition indicating that the relay is not de-energized.

2. A selector circuit in a telephone switching system employing testing on a sleeve conductor, comprising in combination, a relay, a holding winding on said relay, a holding contact circuit on said relay connected to the sleeve conductor, an auxiliary contact on the relay opened and closed to the sleeve conductor with the holding contact, a low impedance winding on the relay in phase opposition to the holding relay winding connected to the auxiliary contact, and means releasing the holding circuit and accelerate the de-energizing period of the relay by coupling the low impedance winding to the sleeve conductor so that testing will indicate a busy line until full release of the holding contacts, thereby preventing false testing.

3. A control circuit for a telephone system having a sleeve conductor comprising in combination a relay having an operating winding and a release winding, contact structure in the relay including three contacts disconnected in de-energized condition of the relay and connected together in energized condition of the relay, an energy source having two terminals with one coupled to one terminal of the operating winding, means energizing the operating winding to close the contacts upon a selected condition by coupling the remaining terminal of the source and operating winding together, selector means operably responsive to a further selected condition coupled to two of said contacts to hold the relay operating winding in energized condition by connecting the remaining terminal of the source and the remaining terminal of the operating winding together through the sleeve conductor, a circuit coupling one terminal of the release winding to the remaining terminal of the source in phase opposition with the operating winding and coupling the other terminal of the release winding to the remaining one of the contacts, the release winding circuits having low impedance compared to the open circuit impedance of the operating winding after the further selected condition terminates, the control circuit further having an energizing circuit through the opposition winding as long as the contacts are connected together, whereby, when the contacts are in opened condition, the release winding is not in circuit and when the contacts are in closed condition, the release winding is shorted as long as the further selected condition exists and is connected to produce quick release of the contacts when the further selected condition terminates thereby affording a detectable low impedance condition until the relay contacts are opened.

4. A relay circuit configuration comprising in combination, a relay having at least one switching armature blade biased in open condition relative to mating contact structure, a first and second winding on the relay inductively coupled to produce a magnetic field for movably affecting the position of the armature, with at least the second being a low impedance winding, an energy source having two terminals, means including the source for energizing a first of the windings to close the armature responsive to selective control conditions, holding means coupled through the contact structure to hold the first winding in circuit with the energy source upon energization thereof under a selected set of conditions, means including the contact structure for coupling both terminals of the said second winding to a single terminal of the energy source when the first winding is in energized condition, means operable upon termination of the selected set of conditions for coupling the second said winding in phase opposition to the first said winding to thereby tend to accelerate the opening of the contact structure, and means operable during the transient conditions of the armature encountered upon deenergization of the relay for connecting the second said winding in circuit to establish a low impedance connection until the contact structure is opened.

References Cited by the Examiner

UNITED STATES PATENTS 2,709,203 5/1955 Buchner ------------- 179—18

FOREIGN PATENTS 1,347,787 11/1963 France.

KATHLEEN H. CLAFFY, *Primary Examiner.*

L. A. WRIGHT, *Assistant Examiner.*